United States Patent

[11] 3,601,476

| [72] | Inventor | Donald R. Mackenzie<br>Plainfield, N.J. |
|---|---|---|
| [21] | Appl. No. | 762,184 |
| [22] | Filed | Sept. 16, 1968 |
| [45] | Patented | Aug. 24, 1971 |
| [73] | Assignee | Bell Telephone Laboratories Incorporated<br>Murray Hill, N.J. |

[54] ADJUSTABLE OPTICAL DEVICE
1 Claim, 3 Drawing Figs.

[52] U.S. Cl. .................................................. 350/285,
331/94.5, 350/288, 350/310
[51] Int. Cl. ........................................................ G02f 1/34
[50] Field of Search ........................................... 331/94.5;
350/288, 310, 285; 74/89, 15; 248/180, 183, 278;
267/47; 260/165

[56] References Cited
UNITED STATES PATENTS

| 2,461,190 | 2/1949 | Wolff, Jr. ..................... | 248/180 |
| 3,225,307 | 12/1965 | Weissman ................... | 331/94.5 |
| 3,334,959 | 8/1967 | Walsh ........................... | 350/310 |
| 3,400,597 | 9/1968 | Nater ........................... | 74/89.15 |

Primary Examiner—David Schonberg
Assistant Examiner—Michael J. Tokar
Attorneys—R. J. Guenther and Edwin B. Cave ABSTRACT: An adjustable holder for optical elements, for use with lasers, exhibits excellent mechanical stability, which is achieved by employment of a beam bent within its elastic limit, to support the optical element. Orientation of the element is then achieved by introducing torsion into the beam, as well as by varying the amount of bending.

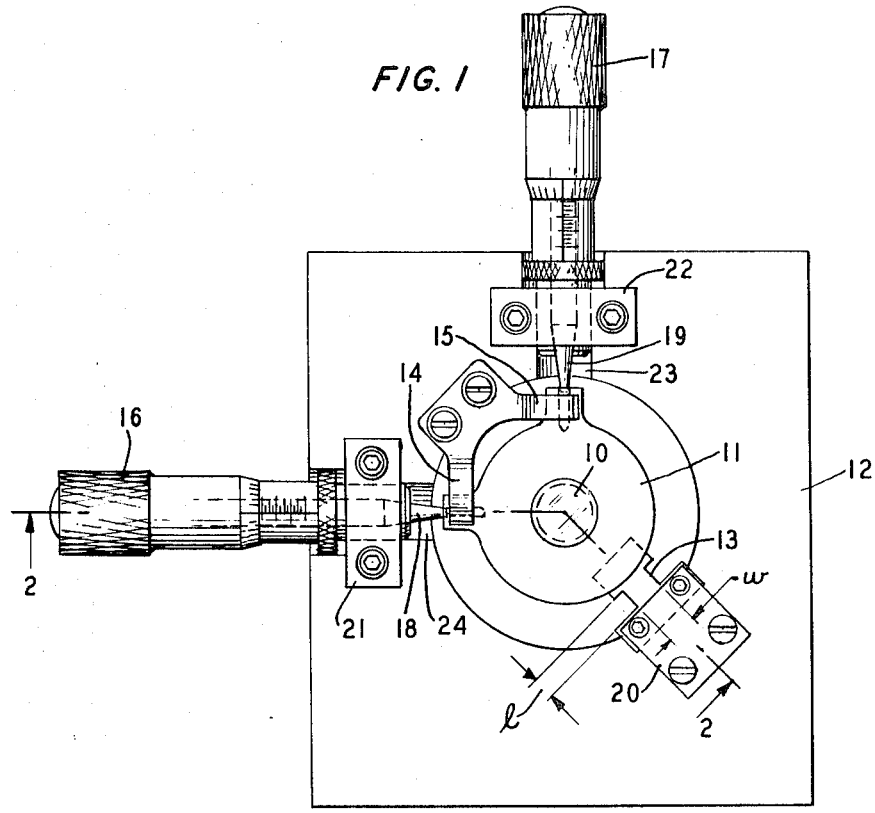
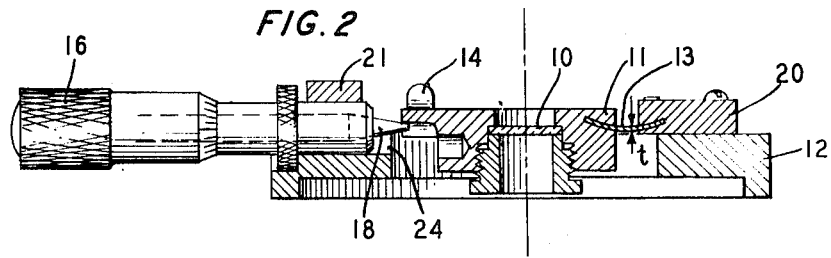
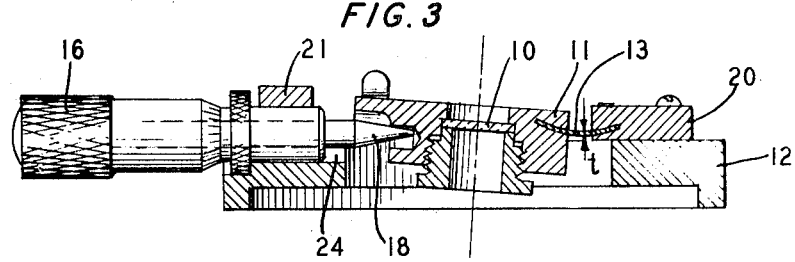
INVENTOR
D. R. MACKENZIE

ADJUSTABLE OPTICAL DEVICE

BACKGROUND OF THE INVENTION

1. Field of the Invention

This invention relates to an adjustable holder for optical elements such as mirrors, for use with lasers.

2. Description of the Prior Art

Various devices have been designed to allow accurate and easy adjustment of the angular position of optical elements such as mirrors, for use with lasers. Such a device is described in U.S. Pat. No. 3,334,959, issued to E. J. Walsh. A problem associated with such devices is their mechanical instability. Vibration from surroundings, for example, is a significant contributing factor to the noise level in laser outputs.

SUMMARY OF THE INVENTION

According to the invention, an adjustable holder for optical elements, for use with lasers, exhibits excellent mechanical stability, which is achieved by employment of a beam bent within its elastic limit, to support the optical element. In this condition, further beam deflection is primarily torsional. Such torsional motion is then used as the principal means of achieving slight angular adjustment of the element with relation to a central axis.

BRIEF DESCRIPTION OF THE DRAWING

FIG. 1 is a plan view of an illustrative embodiment of the inventive device;

FIG. 2 is a sectional view of the device shown in FIG. 1; and

FIG. 3 is a sectional view of the device shown in FIG. 1, wherein the optical element is shown in a condition of adjustment different from that shown in FIG. 2.

DETAILED DESCRIPTION

Referring to the drawing, there is shown an illustrative embodiment of the inventive adjustable mirror device, comprising a circular mirror 10, or other optical element such as a crystal, which is firmly mounted within the central aperture of an annular holder 11. The holder 11, in turn, is secured within an aperture of a frame 12 by a bent beam 13 of length $l$, width $\omega$ and thickness $t$, which operates in the flexural mode to bias the holder 11 in the direction of the central axis of the frame aperture. Two leaf springs 14 and 15 provide additional bias.

The bent beam 13 may be of any elastic spring material such as phosphor bronze, which has a length equal to from 0.85 to 1.10 times its width and a thickness of from 0.09 to 0.140 times its width, the exact length and thickness depending upon the adjusting range desired and the elastic limit (maximum stress without permanent set) of the desired spring material. Increasing the length or decreasing the thickness of the beam increases the adjusting range, but exceeding the limits specified results in the likelihood of appearance of unwanted vibrational modes. Decreasing the length or increasing the thickness decreases the adjusting range, and too short or too thick a beam would be so stiff as to make difficult the fine adjustments contemplated.

In general, loading should be from 65 to 95 percent of the elastic limit, below which unwanted vibrational modes are likely and above which permanent set is likely with large adjustments. Of course, it will be appreciated that within the above range, the amount of deflection obtainable is greater for materials having higher elastic limits. Phosphor bronze beams, for example, may be deflected 10° plus or minus 1.5° within the above loading range.

Two micrometer heads 16 and 17 in the frame 12 have cone-shaped spindles 18 and 19 which bear against the mirror holder 11 in opposition to the beam and spring bias. The heads are located directly opposite the spring leaves 14 and 15 and about 90° apart, so that when either of the heads is adjusted the wedge action of its conical spindle on the mirror holder tilts the holder on an axis defined by the beam and the other head, resulting in torsional motion of the beam, so that optical element 10 can be located precisely perpendicularly to the central axis of the light path or to any other desired inclination, as shown in FIG. 2 and FIG. 3, respectively.

Three metal blocks 20, 21 and 22 are mounted on the frame 12. Blocks 21 and 22 are about 90° apart and each supports one of the micrometer heads. Block 20 is located about equidistant from blocks 21 and 22 and supports the bent beam 13. The two leaf springs 14 and 15 are attached to the frame 12. The frame may be made of hard aluminum, a stainless steel such as Invar, or other metal which can be accurately machined to high tolerances and which will withstand considerable use with little wear, with precut notches 23 and 24, to receive micrometer heads 16 and 17. Of course, numerous other materials could alternatively be used.

It will be appreciated that various modifications may be made by those skilled in the art without departing from the scope or spirit of the invention. For example, simple adjusting screws may be used in place of the micrometer heads. Any number or combination of adjusting means and springs may be used. Accordingly, the springs need not be directly opposite the adjusting means. Of course, certain advantages adhere in the preferred embodiment, such as simplicity, and ease and accuracy of adjustment.

What I claim is:

1. An adjustable optical device comprising:

a frame having a central aperture which defines a central axis;

an optical element attached to a holder;

means for supporting the holder within the aperture substantially transverse to the central axis;

means for mechanically biasing the holder in the direction of the central axis; and means for inclining the holder with respect to the central axis comprising at least two adjusting members mounted to the frame and having end portions which extend into the aperture, said end portions bearing against the holder in opposition to the mechanical bias of the biasing means;

characterized in that:

said means for supporting the holder consists essentially of a single beam, the beam extending from the holder to the frame along a first axis defined by a radius extending outwardly from and normal to the central axis, the beam having a length L along said axis, and further having a thickness T along a second axis normal to the first axis and normal to the largest surface of the beam, the beam further having a width W along a third axis normal to the first and second axis, said length being 0.85 to 1.10 times the width, and the width being seven times the thickness, the beam being bent along said first axis to within 65–95 percent of the load at its elastic limit.